Patented Feb. 18, 1930

1,747,774

UNITED STATES PATENT OFFICE

WILLIAM HOSKINS, OF CHICAGO, ILLINOIS

PLASTIC MASS

No Drawing.    Application filed September 24, 1923.   Serial No. 664,584.

In accordance with the present invention, a plastic mass capable of being set to an integral body when subjected to moderately high temperatures may be formed in the following manner.

A suitable filler, which may be, for example, sawdust, wood flour, ground cork, asbestine, ground asbestos, barytes or other inert material, is superficially coated (with greater or less impregnation) with glue or gelatine. This may be suitably accomplished by thoroughly mixing the filler with glue (preferably liquefied by soaking and dissolving in water) drying the mixture and again reducing it to finely divided or granular form comparable to the character of the original filler.

The material so prepared is then thoroughly mixed with cold water containing hexamethylenetetramine in solution, the proportion of this solution employed being preferably sufficient to only dampen the entire mass of glue treated filler. I prefer to use a 20% solution of hexamethylenetetramine, although I may employ solutions of varying concentrations, for example, from 10% to 50%. The proportional amount of the solution taken will vary, as is readily apparent, with the absorptive character of the filler and with the fineness of its subdivision. The proportional amounts are illustrated in the case of ground cork as a filler in the example hereinafter given.

The mass is next placed in a mold shaped to the desired form, a relatively slight pressure being thereby maintained upon it, and the mixture is heated to a relatively moderate temperature, say 160° to 250° F., for eight to twenty-four hours. It has been found satisfactory, for example, to heat the mixture on steam coils to a temperature of about 200° F. for about twelve hours. By this treatment it is set and hardened throughout and may, if desired, be subjected to any desired mechanical forming treatment, such as turning, routing or the like.

The following specific example illustrates the invention:

20 ounces of ground cork are thoroughly mixed with from 10 to 20 ounces of a liquefied glue prepared by mixing glue with water in the proportion of one part glue to one to three parts of water, the solution or dispersion of the glue being effected with cold water in the ordinary manner, the glue being preferably first soaked in cold water. The mixture of ground cork and liquefied glue is then dried out, being subsequently broken up and ground up until it again has approximately the character of the original ground cork employed. The dried mixture thus prepared is then thoroughly mixed with sufficient hexamethylenetetramine solution (in cold water) to effect a thorough dampening of the mixture. The solution may contain from 10 to 50% of hexamethylenetetramine although a 20% solution is employed. About 2 ounces of the solution has been found to be sufficient to dampen 10 ounces of the cork glue mixture, although, as is readily apparent, the amount of the solution required may vary with atmospheric conditions and with varying sizes and kinds of cork. The mixture is then shaped, retained in a mold and set by heat in the manner described. Such a mixture has been found useful in forming cork handles for billiard cues, fishing poles and the like, the mixture being preferably formed on its support somewhat oversize and being turned down to the desired contour after setting. The resulting composition is resistent to impact and is substantially water proof throughout.

As has been previously stated any desired filler may be employed, the proportions of glue and hexamethylenetetramine solution being varied in accordance with the characteristics of the fillers in the manner well known in the art. Although the invention has been described in connection with the details of the preparation of a specific embodiment thereof, it is not intended that these details shall be regarded as limitations upon the scope of the invention except in so far as included in the accompanying claims.

I claim:

1. The method of preparing a plastic mass which comprises superficially dampening dry, glue coated particles of a filler with hexamethylenetetramine.

2. The method of preparing a plastic mass which consists in applying glue to a subdivided filler, drying the mass and comminuting it to obtain dry glue coated particles, and incorporating hexamethylenetetramine solution therewith in quantity sufficient to dampen the glue coated particles superficially.

3. The method of preparing a plastic mass which consists in applying glue to ground cork, drying the mass and comminuting it to obtain dry glue coated particles, and incorporating hexamethylenetetramine therewith in quantity sufficient to dampen the glue coated particles superficially.

4. The method of forming a molded mass which consists in incorporating hexamethylenetetramine with dry, glue coated filler particles in quantity sufficient to dampen said particles superficially and heating the mass while retained in a mold.

5. The method of forming artificial cork handles which consists in incorporating hexamethylenetetramine with dry, glue coated particles of cork so as to dampen said particles superficially, forming the mass in the desired position, heating it and subsequently mechanically shaping it.

6. A plastic mass comprising dried glue-coated filler particles, hexamethylenetetramine and water in sufficient quantity to dampen said particles superficially.

WILLIAM HOSKINS.